United States Patent
Pawlowski

(10) Patent No.: US 6,266,796 B1
(45) Date of Patent: Jul. 24, 2001

(54) DATA ORDERING FOR CACHE DATA TRANSFER

(75) Inventor: Joseph Thomas Pawlowski, Boise, ID (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 09/136,169

(22) Filed: Aug. 19, 1998

Related U.S. Application Data

(63) Continuation of application No. 08/650,470, filed on May 20, 1996, now Pat. No. 5,825,788.

(51) Int. Cl.⁷ .................................................. G11C 29/00
(52) U.S. Cl. ............................................................. 714/763
(58) Field of Search .................................... 714/763, 754; 395/307, 312; 710/33, 35

(56) References Cited

U.S. PATENT DOCUMENTS

| | | | |
|---|---|---|---|
| 4,740,969 | * 4/1988 | Fremont | 371/12 |
| 5,015,883 | 5/1991 | Waller | 307/465 |
| 5,091,846 | 2/1992 | Sachs et al. | 395/250 |
| 5,164,944 | 11/1992 | Benton et al. | 371/40.1 |
| 5,220,215 | 6/1993 | Douglas et al. | 307/465 |
| 5,228,135 | * 7/1993 | Ikumi | 395/425 |
| 5,235,221 | 8/1993 | Douglas et al. | 307/465 |
| 5,287,017 | 2/1994 | Narasimhan et al. | 307/465 |
| 5,298,803 | 3/1994 | Starkweather | 307/465 |
| 5,300,830 | 4/1994 | Hawes | 307/465 |
| 5,317,738 | * 5/1994 | Cochcroft et al. | 395/650 |
| 5,394,528 | * 2/1995 | Kobayashi et al. | 710/127 |
| 5,469,555 | 11/1995 | Ghosh et al. | 395/460 |
| 5,471,602 | * 11/1995 | DeLano | 395/445 |
| 5,559,986 | 9/1996 | Alpert et al. | 395/471 |
| 5,586,303 | 12/1996 | Willenz et al. | 395/497.03 |
| 5,590,352 | 12/1996 | Zuraski, Jr. et al. | 395/800 |
| 5,627,963 | 5/1997 | Gabillard et al. | 395/183.18 |
| 5,644,788 | * 7/1997 | Courtright et al. | 710/35 |
| 5,701,503 | * 12/1997 | Singh et al. | 395/800 |
| 5,781,923 | * 7/1998 | Hunt | 711/128 |
| 5,781,926 | * 7/1998 | Gaskins et al. | 711/145 |
| 5,809,514 | * 9/1998 | Nasserbakht et al. | 711/3 |
| 5,809,530 | * 9/1998 | Samra et al. | 711/140 |
| 5,825,788 | * 10/1998 | Pawlowski | 371/40.11 |
| 5,862,154 | * 1/1999 | Pawlowski | 371/40.11 |

* cited by examiner

*Primary Examiner*—Albert Decady
*Assistant Examiner*—Shelly A Chase
(74) *Attorney, Agent, or Firm*—Schwegman, Lundberg, Woessner & Kluth, P.A.

(57) ABSTRACT

A system and method for ordering the transfer of data words within a cache line transfer. The cache memory receives an address from a processor and selects the cache line corresponding to the address. The cache memory then determines an order for transferring cache line data words from the selected cache line based on the likelihood that each data word in the order will be needed by the processor. The data words are then transferred to the processor in the desired order.

45 Claims, 5 Drawing Sheets

| TAG | WORD A.1 | WORD A.2 | WORD A.3 | WORD A.4 | 25.1 |
|---|---|---|---|---|---|
| | WORD B.1 | WORD B.2 | WORD B.3 | WORD B.4 | 25.2 |
| | WORD C.1 | WORD C.2 | WORD C.3 | WORD C.4 | 25.3 |
| | WORD D.1 | WORD D.2 | WORD D.3 | WORD D.4 | 25.4 |

FIG. 2

| TAG | WORD A.1 | WORD A.2 | WORD A.3 | WORD A.4 | 28.1 |
|---|---|---|---|---|---|
| TAG/ECC | WORD B.1 | WORD B.2 | WORD B.3 | WORD B.4 | 28.2 |
| TAG/ECC | WORD C.1 | WORD C.2 | WORD C.3 | WORD C.4 | 28.3 |
| TAG/ECC | WORD D.1 | WORD D.2 | WORD D.3 | WORD D.4 | 28.4 |

FIG. 3A

| TAG/ECC | WORD A.1 | WORD A.2 | WORD A.3 | WORD A.4 | 29.1 |
|---|---|---|---|---|---|
| WORD D.1 | WORD D.2 | WORD B.2 | WORD B.3 | WORD B.4 | 29.2 |
| WORD D.3 | WORD D.4 | WORD C.2 | WORD C.3 | WORD C.4 | 29.3 |

FIG. 3B

DATA ORDERING FOR CACHE DATA TRANSFER

This application is a continuation of Ser. No. 08/650,470 filed May 20, 1996 now U.S. Pat. No. 5,825,788.

BACKGROUND OF THE INVENTION

1. Field of the Invention

The present invention relates to cache memory architectures and in particular to a data ordering which can be used in transfers from cache memory to increase the likelihood that the first words transferred will be useful.

2. Background Information

The speed with which a processor can access data is critical to its performance. At the same time, providing uniformly fast memory access can be cost prohibitive. To get around this problem, computer architectures have relied on a mix of fast, less dense, memory and slower bulk memory. In fact, many computer architectures have a multilevel memory architecture in which an attempt is made to find information in the fastest memory. If the information is not in that memory, a check is made at the next fastest memory. This process continues down through the memory hierarchy until the information sought is found. One critical component in such a memory hierarchy is a cache memory.

Cache memories rely on the principle of locality to attempt to increase the likelihood that a processor will find the information it is looking for in the cache memory. To do this, cache memories typically store contiguous blocks of data. In addition, the cache memory stores a tag which is compared to an address to determine whether the information the processor is seeking is present in the cache memory. Finally, the cache memory may contain status or error correcting codes (ECC). Cache memories are usually constructed from higher speed memory devices such as static random access memory (SRAM).

The typical cache memory transfers a cache line as a contiguous block of data, starting at the first word in the cache line and proceeding through to the last. This method of transferring cache lines does not take into account the fact that the processor may have no need for the first word in the cache line and that, therefore, it must wait a number of cycles until the word it is looking for is transferred.

What is needed is a method of ordering data transferred from a cache memory to a processor which increases the likelihood that useful data is transferred in the first transfer cycle.

SUMMARY OF THE INVENTION

The present invention is a system and method for ordering the transfer of data words within a cache line transfer. The cache memory receives an address from a processor and selects the cache line corresponding to the address. The cache memory then determines an order for transferring cache line data words from the selected cache line based on the likelihood that each data word in the order will be needed by the processor. The data words are then transferred to the processor in the desired order.

BRIEF DESCRIPTION OF THE DRAWINGS

FIG. 2 is an illustration of a cache line transfer according to the present invention;

FIGS. 3a and 3b are illustrations of alternative methods of transferring a cache line;

DETAILED DESCRIPTION OF THE PREFERRED EMBODIMENTS

In the following Detailed Description of the Preferred Embodiments, reference is made to the accompanying Drawings which form a part hereof, and in which are shown by way of illustration specific embodiments in which the invention may be practiced. It is to be understood that other embodiments may be utilized and structural changes may be made without departing from the scope of the present invention.

Figure 1:
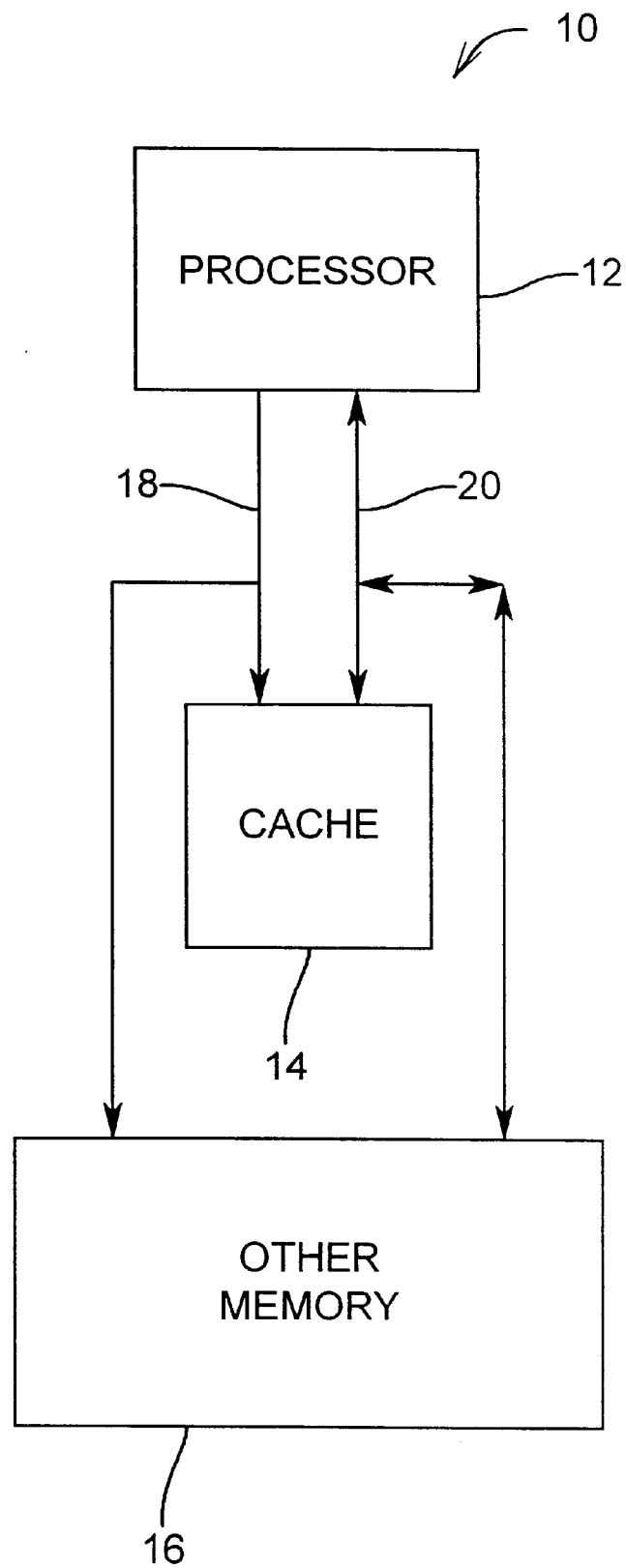
FIG. 1 illustrates a multiple memory level computer system in which a processor communicates with a cache memory and other memory over an address bus and a data bus.

FIG. 1 illustrates a multiple memory level computer system 10 in which a processor 12 communicates with a cache memory 14 and a memory 16 over an address bus 18 and a data bus 20. Cache lines read from cache memory 14 are transferred over data bus 20 to processor 12. In one embodiment, processor 12 is a 64-bit microprocessor which transfers data as longwords (i.e., four 16-bit words).

As noted above, the typical cache memory 14 transfers a cache line as a contiguous block of data, starting at the first entry in the cache line and proceeding through to the last. This method of transferring cache lines does not take into account the fact that the processor may have no need for the first word in the cache line and that, therefore, it must wait a number of cycles until the word it is looking for is transferred. A better approach to transferring the cache line takes into account the word the processor was seeking in the cache, transferring that word first and then following that word with words from the cache line in the order that the processor is most likely to require the words. This approach can be best understood by referencing FIG. 2.

In the example shown in FIG. 2 words A, B C and D, in that order, represent the order of data criticality to the processor. The actual physical address which is considered critically ordered differs from processor to processor in existing implementations and may entail a modula-4 linear burst, a modula-4 interleaved order, etc. The optimal order for this type of device is modula-4 linear burst. Any other ordering will prevent maximization of performance for a processor designed to utilize the 96-bit operation. Hence, A, B, C, and D would show the following sequence represented in binary form in which X stands for "any":

TABLE 1

Data Ordering in a Four Entry Cache Line

| Initial address | A | B | C | D |
| --- | --- | --- | --- | --- |
| x00 | x00 | c01 | x10 | x11 |
| x01 | x01 | x10 | x11 | x00 |
| x10 | x10 | x11 | x00 | x01 |
| x11 | x11 | x00 | x01 | x11 |

Note that the entries in the four entry cache line may be words, longwords, etc.

As can be seen in FIG. 2, in a cache memory system having a data bus wide enough to transfer not only the data word but also the tag word, transfer of a four entry cache line can be accomplished in four cache transfer cycles 25.1–4. In the example shown, tag word 26 is transferred in the first of cache transfer cycles 25. This tends to be the most efficient way of transferring tag word 26. In another embodiment, portions of tag word 26 may be sent in two or more cycles 25.

In one embodiment, as note above, processor 12 is a 64-bit microprocessor which transfers data as longwords (i.e., four 16-bit words). Previous processor-cache interfaces implemented the processor-cache interface using a 64-bit bus for data and an additional bus for tag. The tag bus width has varied, but has nominally been 16-bit for a total of 80 bits. The problem with such an approach is that if the cache block (also called line) size is four times the data bus width, then no useful information appears on the tag bus for three out of every four bus cycles. As can be seen in FIG. 2, this is a waste of bus bandwidth which can adversely affect processor performance.

To more efficiently utilize the available bandwidth, one might include other information in the unused cycles. One such way of doing this is shown in FIG. 3a and is described in U.S. patent application Ser. No. 08/778,886, and now Issued U.S. Pat. No. 5,862,154, entitled VARIABLE BIT WIDTH CACHE MEMORY ARCHITECTURE, filed herewith by Pawlowski, the description of which is incorporated herein by reference. In FIG. 3a, words A–D are still transferred as in FIG. 2. In addition, other information such as error correcting code (ECC) words or status words are inserted in the unused tag word slots. Note that this style of operation still requires four bus cycles to transfer all necessary data. It does, however, allow for a larger tag and/or ECC than would otherwise be possible, once again improving the utilization of the 80 input/output lines. Performance is maximized if all tag information can be supplied in the first cycle and non-time critical following in subsequent cycles.

For 80-bit operation, to maximize performance, the tag limit is 16 bits. If more tag bits are needed, the 80-bits would be expanded within reason to accommodate the additional necessary bits. For example, if a 20-bit tag is essential, this would entail an 84-bit bus. 11 bits of ECC is sufficient regardless of tag size, within reason.

In an alternate embodiment even more bandwidth efficiency can be gained by increasing the width of data bus 20 by an additional word and then merging tag, ECC and data into an ordered block of information. On such embodiment is shown in FIG. 3b and is described in U.S. patent application Ser. No. 08/778,886, and now Issued U.S. Pat. No. 5,862,154, entitled VARIABLE BIT WIDTH CACHE MEMORY ARCHITECTURE, described above, the description of which is incorporated herein by reference. In such an embodiment, as is shown in FIG. 3b, the entire block of four operands, tag and ECC are transferred in 3 bus cycles 29.1–3. Tag and ECC data appear only during the first cycle (cycle 29.1), freeing those input/output lines for data transfer during cycles two and three. In the embodiment shown, tag and ECC can be partitioned among the available two words in any manner.

(It should be noted that ECC is not a necessary component but it is important to allow space for this to be implemented. The implementation would consist of a single data check of a full block (tag plus data A B C and D). This requires 11 bits of ECC for 256 bits of data plus up to 21 bits of tag/status information. The 21 bits is the limit imposed on the 96-bit device.)

Figure 4:
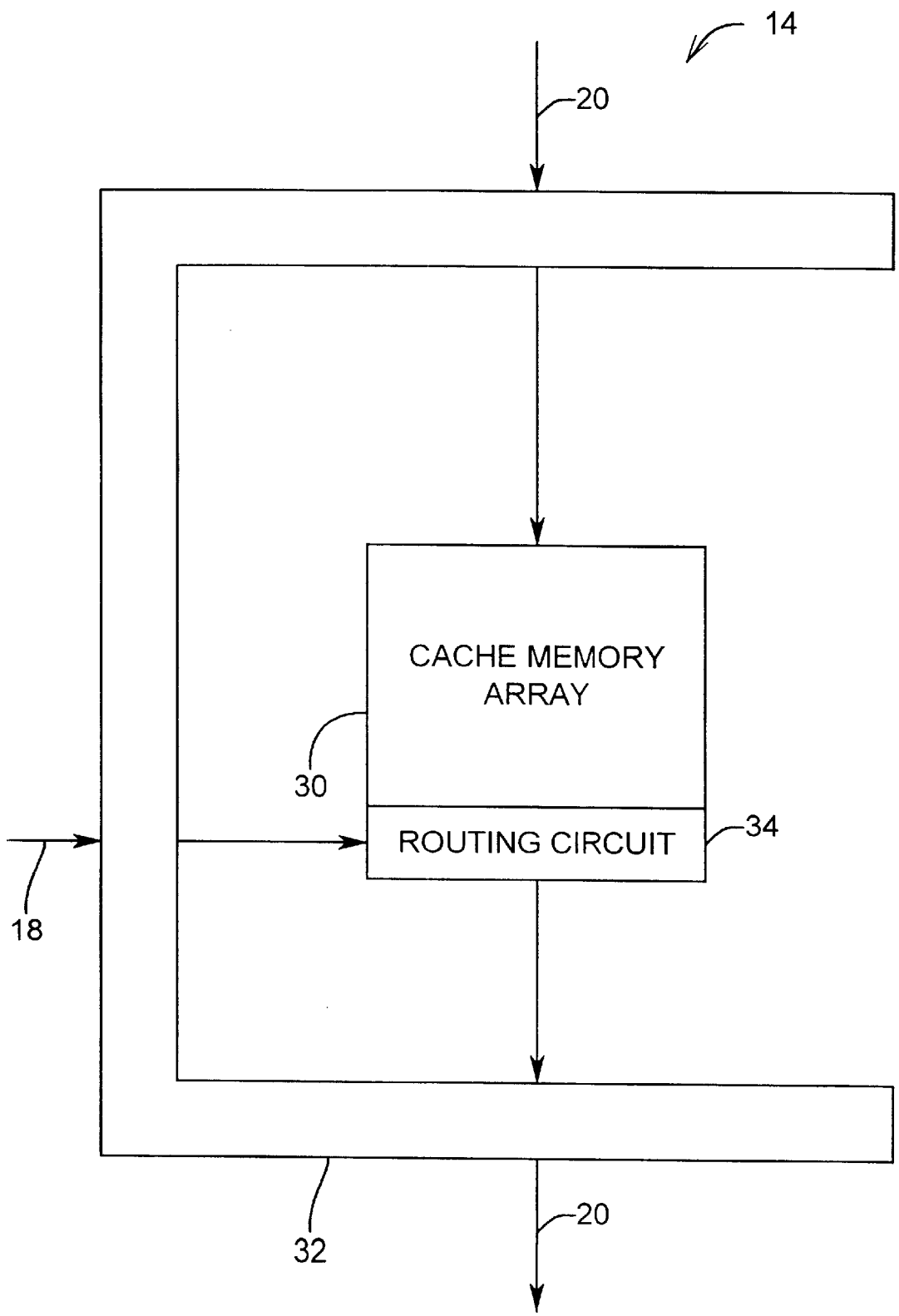
FIG. 4 illustrates a cache memory which can be used in the system of FIG. 1.

In one embodiment, as is shown in FIG. 4, cache memory 14 includes a memory array 30, a processor-cache interface 32 and a routing circuit 34. In FIG. 4, processor-cache interface 32 is connected to processor 12 over an M-word wide data bus 20. Routing circuit 34 takes the P+1 words of data and tag and transfers them in groups of M words to processor-cache interface 32. Processor-cache interface 32 in turn transfers the groups of M words to processor 12 over the M-word wide data bus 20. In one embodiment, cache memory 14 is configured as an N line cache, where each cache line includes a tag word and P words of data. That is, memory array 30 is an M line by P+1 word memory array. In one such embodiment, the P words of data also include one or more error correction code (ECC) words.

Figure 5:
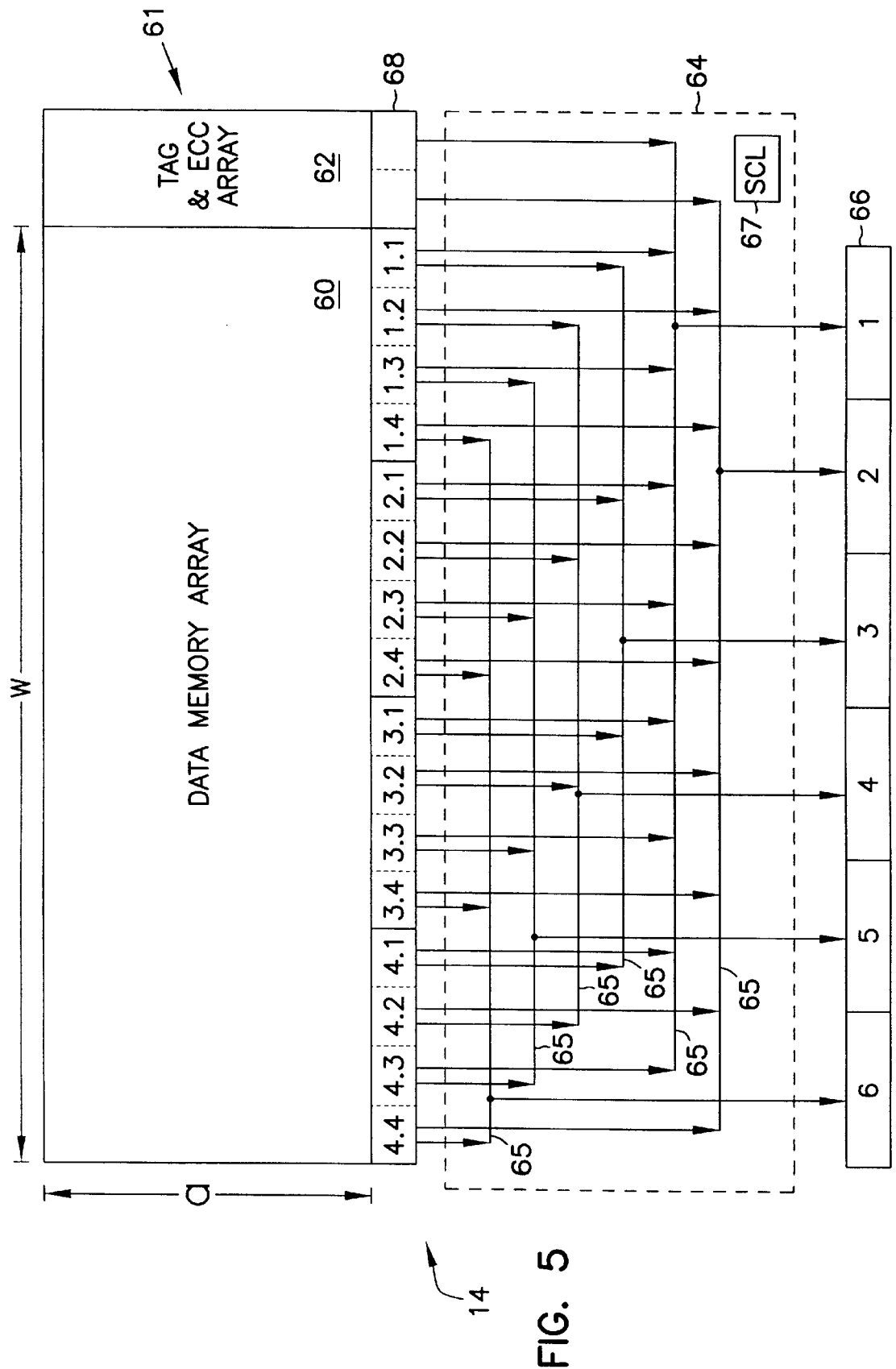
FIG. 5 is a block diagram representative of one embodiment of the cache memory of FIG. 4.

In one embodiment, the data ordering is designed to minimize the complexity of implementation and to allow one memory array design to operate as a 96 or 80-bit bus device. For instance, cache memory 14 may be implemented using an architecture which supports data transferred in the manner shown in FIGS. 3a and 3b. One such cache memory 14 is shown in FIG. 5. Cache memory 14 includes a cache memory array 61, a routing circuit 64 and a processor-cache interface 66. Cache memory array 61 includes a data memory array 60, a tag & ECC memory array 62 and a sense circuit 68. Data memory array 60 and a tag & ECC memory array 62 are connected through sense circuits 68 and routing circuit 64 to processor-cache interface 66. Routing circuit 64 includes selector circuits 65 and selection control logic 67. Selection control logic 67 controls the transfer of words from arrays 60 and 62 through selector circuits 65 to specific words within processor-client interface 66 according to the ordering shown in Table 1 above. In the embodiment shown, each line of the combined data memory array 60 and tag & ECC memory array 62 is a cache line in cache memory 14.

For 16-bit words, the architecture shown in FIG. 5 employs a data transfer methodology which permits higher useful data throughput on a 96-bit bus than what has been previously achieved with an 80-bit bus. To accomplish this, the architecture integrates data, tag, status and ECC. In the example shown in FIG. 3b, an entire block (which in this example is made up of a group of four longword data operands (longwords 1–4), tag, optionally status and/or ECC) is manipulated at one time with external routing at the appropriate width (via routing circuit 64).

The advantage of the architecture used for data memory 60, tag & ECC array 62 and sense circuit 68 in FIG. 5 is the provision to route memory array contents to/from processor-cache interface according to either an 80(+) or 96-bit data ordering concept. In FIG. 5, the pathways which must be available in routing circuit 64 in order to implement the six word wide operation are shown as arrows. At each cache memory transfer cycle, selection control logic 67 enables six of the 34 available pathways in order to provide the composite six word wide bus transaction. In one group of embodiments, where a 16-bit word is used, data memory array 60 is 256-bits wide and tag+ECC+status array 62 is 16 to 32-bits wide. If the tag+ECC+status array is 16-bits wide or less, then one less pathway is required (i.e., eliminates the pathway from the tag/ECC array to output word number 2 in the diagram). Using this architecture, sufficient bandwidth is present in the three 96-bit cycles to deliver as much data and tag information as is present in four cycles at 80-bits due to the compactness of data transactions.

Figure 6:
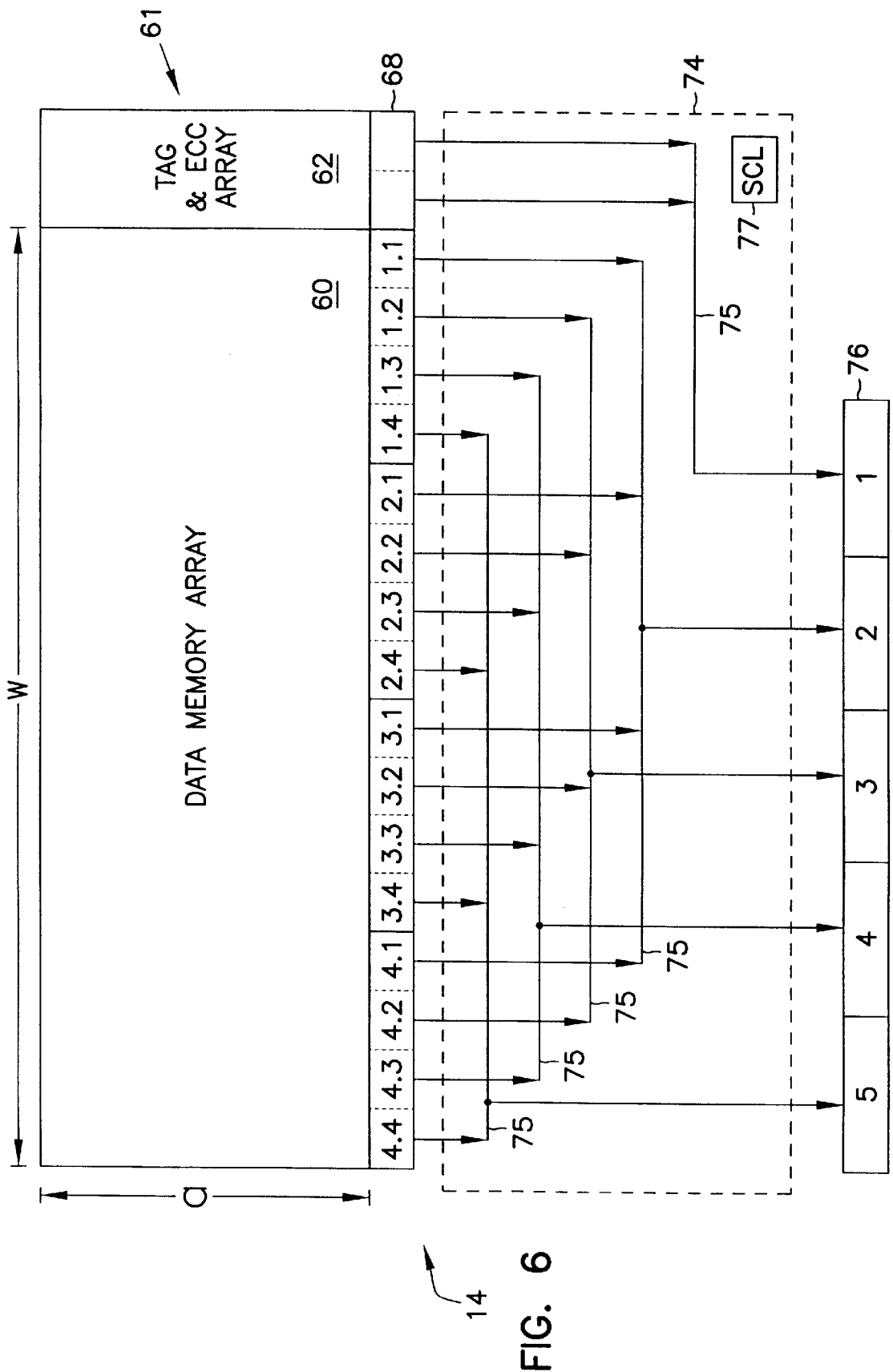
FIG. 6 is a block diagram representative of another embodiment of the cache memory of FIG. 4.

FIG. 6 illustrates the physical organization of a cache memory 14 with data routing implementing an 80(+)-bit device. As in FIG. 5 above, cache memory 14 includes a cache memory array 61. Cache memory array 61 includes a data memory array 60, a tag & ECC memory array 62 and a sense circuit 68. In addition, cache memory 14 of FIG. 6 includes a routing circuit 74 and a processor-cache interface 76. Data memory array 60 and a tag & ECC memory array 62 are connected through sense circuit 68 and routing circuit 74 to processor-cache interface 76. Routing circuit 74 includes selector circuits 75 and selection control logic 77. Selection control logic 77 controls the transfer of words from arrays 60 and 62 through selector circuits 65 to specific words within processor-client interface 76 according to the ordering shown in Table 1 above. As in the embodiment shown in FIG. 5, the architecture shown in FIG. 6 integrates data, tag, status and ECC. In the example shown an entire block (which in this example is made up of a group of four longword data operands (longwords 1–4), tag, optionally status and/or ECC) is manipulated at one time with external routing at the appropriate width (via routing circuit 74).

In the embodiment shown in FIG. 6, the pathways which must be available in routing circuit 74 in order to implement the five word wide operation are shown as arrows. At each cache memory transfer cycle, selection control logic 77 enables five of the 17–20 available pathways in order to provide the composite five word wide bus transaction. As in FIG. 5, in one group of embodiments, where a 16-bit word is used, data memory array 60 is 256-bits wide and tag+ECC+status array 62 is 16 to 32-bits wide. If tag+ECC+status array 62 is 16-bits wide or less, then one less pathway is required (i.e. only 17 pathways are needed). On the other hand, tag+ECC+status array 62 can be up to four words wide and all necessary transfers can still be accomplished in only four transfer cycles. (In one such embodiment, tag+ECC+status array 62 could be 64-bits wide maximum with an 80-bit bus resulting in the 20 necessary pathways, all feeding into output block number 1.) Since ECC and status information may transact on bits once restricted to tag use only, this architecture is superior to previous implementations in its ability to make more use of the bits normally defined as tag only.

It can be readily seen from examining FIGS. 5 and 6 that routing circuit 74 and processor-cache interface 76 of FIG. 6 are basically a subset of routing circuit 64 and processor-cache interface 66, respectively, of FIG. 5 (blocks one and two of FIG. 5 are merged into block one of FIG. 6). Therefore, the same cache memory 14 architecture can function as either a six word wide (e.g., 96-bit) or five word wide (e.g., 80(+)-bit) device with the necessary selection logic modifications.

Although the present invention has been described with reference to selected embodiments, those skilled in the art will recognize that changes may be made in form and detail without departing from the spirit and scope of the invention. In particular, the width of the data, tag or ECC words could be increased or decreased, as could the width of the bus serving as the processor-cache interface.

What is claimed is:

1. A method of supplying cache memory data to a processor, comprising:
    selecting a cache line from a cache memory array having a plurality of cache lines wherein each cache line includes data in a contiguous block;
    transferring the data in the selected cache line to a processor-cache interface in a selected order, wherein the selected order corresponds to an order of data criticality to the processor; and
    forwarding the data in the selected order from the processor-cache interface to the processor.

2. The method according to claim 1, wherein selecting, transferring and forwarding are performed in the sequence as shown.

3. The method according to claim 1, wherein transferring the data includes transferring status bits and error correction code bits with the selected cache line.

4. The method according to claim 1, wherein an order of data criticality to the processor is a function of probability of expected need.

5. A cache memory, comprising:
    a cache memory array having a plurality of cache lines, wherein each cache line includes data bits and tag bits;
    an interface, coupled to the cache memory array and to a processor;
    a routing circuit, coupled between the interface and the cache memory array,
    wherein the routing circuit includes means for ordering the contents of each cache line according to a predetermined order and for transferring the ordered contents to said interface, further wherein the predetermined order is determined as a function of a processor coupled to the memory.

6. The cache memory of claim 5, wherein each cache line further includes status bits and error correction code bits.

7. The cache memory of claim 5, wherein the means for ordering comprise selector control logic and a plurality of selector circuits.

8. The cache memory of claim 5, wherein the predetermined order is a function of criticality to the processor.

9. The cache memory of claim 5, wherein each cache line is a contiguous block of memory.

10. The cache memory of claim 5, wherein data is stored in the cache memory array without regard to data criticality to the processor.

11. A data ordering device, comprising:
    a data memory array having a plurality of data memory array cache lines wherein
    the content of each cache line includes a plurality of cache line data words;
    a tag array having a plurality of tag array cache lines wherein the contents of each tag array cache line includes tag bits and wherein the data stored within the data memory array cache lines is associated with tag bits stored in the tag array cache lines;
    an interface circuit coupled to the data memory array and tag array and to the processor, wherein the interface circuit is adapted for storage of ordered data and for sequentially transferring said ordered data to a processor;
    selection control logic for sequencing the data from the data memory array cache line and the tag array cache line into a preselected ordered arrangement; and
    a plurality of selector circuits wherein each selector circuit is responsive to selection control logic and wherein the plurality of selector circuits couples the contents of the data memory array cache line and the tag array cache line to the interface circuit.

12. The data ordering device of claim 11, wherein the preselected ordered arrangement is a function of criticality to the processor.

13. The data ordering device of claim 11, wherein each tag array cache line includes status bits and error correction code bits.

14. The data ordering device of claim 11, wherein the interface circuit is coupled to the data memory array and the tag array by a sense circuit.

15. The data ordering device of claim 11, wherein the data memory array and tag memory array have an aggregate width between approximately 80 bits and approximately 96 bits, and wherein the width of the data memory array cache lines correspond to the tag memory array cache lines.

16. A cache memory, comprising:
a cache memory array having a plurality of cache lines, wherein each cache line includes a tag word and N data words;
a processor-cache interface, wherein the processor-cache interface includes an M-word wide bus, wherein the ratio of M:N is approximately 0.25; and
a routing circuit connected to the memory array and the processor-cache interface, wherein the routing circuit includes:
a plurality of selector circuits; and
selection control logic connected to the plurality of selector circuits, wherein the selection control logic controls the transfer of groups of M words from the cache memory array to the processor-cache interface, wherein the words are transferred in order over a plurality of cache transfer cycles, according to the likelihood that the transferred words will be needed, wherein words more likely to be needed by the processor are transferred before words less likely to be needed by the processor and wherein the first group of M words includes words more likely to be needed by a processor.

17. The cache memory according to claim 16, wherein M is four and N is sixteen.

18. A computer system, comprising:
a processor having an address bus and an M-word wide data bus, wherein M is greater than two;
a memory connected to the processor by the address bus and the data bus; and a cache memory, wherein the cache memory includes:
a cache memory array having a plurality of cache lines, wherein each cache line includes a tag word and N data words, wherein the ratio of M:N is approximately 0.25; and
a processor-cache interface connected to the processor and the memory by the address bus and the data bus; and
a routing circuit connected to the memory array and the processor-cache interface, wherein the routing circuit includes a plurality of selector circuits and selection control logic connected to the plurality of selector circuits, wherein the selection control logic controls the transfer of groups of M words from the cache memory array to the processor-cache interface, wherein groups of M words having the word more likely to be needed by the processor are transferred before groups of M words having words less likely to be needed by the processor.

19. A computer system, comprising:
a processor having an address bus and an M-word wide data bus, wherein M is greater than two;
a memory connected to the processor by the address bus and the data bus; and
a cache memory, wherein the cache memory includes:
a cache memory array having a plurality of cache lines, wherein each cache line includes a tag word, status bits, error correction code bits, and N data words, wherein N is greater than M;
a processor-cache interface connected to the processor and the memory by the address bus and the data bus; and
a routing circuit connected to the memory array and the processor-cache interface, wherein the routing circuit includes a plurality of selector circuits and selection control logic connected to the plurality of selector circuits, wherein the selection control logic controls the transfer of groups of M words from the cache memory array to the processor-cache interface, wherein groups of M words having the word more likely to be needed by the processor are transferred before groups of M words having words less likely to be needed by the processor.

20. A computer system, comprising:
a processor having an address bus and an M-word wide data bus, wherein M is greater than two;
a memory connected to the processor by the address bus and the data bus; and
a cache memory, wherein the cache memory includes:
a cache memory array having a plurality of cache lines, wherein each cache line includes a tag word and N data words, wherein N is greater than M, and wherein each cache line comprises a contiguous block of memory;
a processor-cache interface connected to the processor and the memory by the address bus and the data bus; and
a routing circuit connected to the memory array and the processor-cache interface, wherein the routing circuit includes a plurality of selector circuits and selection control logic connected to the plurality of selector circuits, wherein the selection control logic controls the transfer of groups of M words from the cache memory array to the processor-cache interface, wherein groups of M words having the word more likely to be needed by the processor are transferred before groups of M words having words less likely to be needed by the processor.

21. A method of transferring computer data from memory, comprising:
accessing data entries in a cache memory array, the cache memory array including a plurality of data entries arranged in a line;
ordering each of the data entries in the line as a function of criticality to the processor; and
transferring the data entries to an interface in the selected order after all data entries in the line have been ordered.

22. The method of claim 21, wherein accessing, ordering and transferring are performed in the in sequence as shown.

23. The method of claim 21, wherein ordering each of the data entries includes selecting data entries within a cache line of a cache memory array.

24. The method of claim 21, wherein the function of criticality takes into account the likelihood of expected need.

25. The method of claim 21, wherein transferring the data entries to an interface in the selected order includes transferring data bits and tag bits to the interface in the selected order.

26. The method of claim 21, wherein transferring the data entries to an interface in the selected order includes transferring status bits and error correction code bits to the interface in the selected order.

27. A system comprising:
a routing circuit for coupling to a cache memory array, the routing circuit accessing a plurality of words arranged in a line of the cache memory array, the routing circuit comprising:
a plurality of pathways wherein each word is coupled to two or more pathways; and
selection control logic for controlling the transfer of words on the plurality of pathways wherein for each of a plurality of cache transfer cycles, a subset of the plurality of words are transferred as a function of word criticality to a processor; and an interface coupled to the routing circuit, the interface adapted to receive the subset of words transferred on the plurality of pathways and to transfer the subset of words to the processor over a data bus.

28. The system of claim 27 wherein the routing circuit is coupled to the cache memory array via a sense circuit.

29. A method of transferring cache memory comprising:
selecting an order for transferring data from a cache memory to a processor, wherein the order is selected as a function of the processor;
sensing a first transfer cycle;
enabling a plurality of pathways for transferring a plurality of words, the plurality of pathways determined as a function of the selected order for transferring;
transferring the plurality of words to an interface using the enabled plurality of pathways;
forwarding the plurality of words to a processor using a data bus.

30. The method of claim 29 further comprising sensing a second transfer cycle and repeating sensing, enabling, transferring, and forwarding.

31. The method of claim 29 wherein selecting an order comprises programming the desired order.

32. The method of claim 29 wherein selecting an order comprises selecting interleaved burst data ordering or selecting linear burst data ordering.

33. The routing circuit of claim 32 wherein the second memory array is an interface coupled to the processor.

34. The routing circuit of claim 32 wherein the first memory array comprises a plurality of lines of data and tag information.

35. A routing circuit comprising:
a plurality of pathways for transferring a plurality of words from a first memory array to a second memory array, wherein each word in the first memory array is coupled to two or more pathways of the plurality of pathways; and
selection control logic coupled to each of the plurality of pathways, the logic adapted for receiving information corresponding to an order of criticality to a processor and wherein the logic enables a subset of the plurality of pathways for each of a plurality of transfers, and further wherein the plurality of words in the first memory array are transferred to the second memory array via the enabled subset of pathways.

36. A cache memory system comprising:
a memory array comprising:
a data array having a plurality of data words, each data word stored in an entry, the entries arranged in a plurality of lines; and
a tag and error correction code (ECC) array having a plurality of tag bits and ECC bits, the tag bits and ECC bits stored in entries, wherein particular tag bits and ECC bits correspond to a particular line of data words in the plurality of lines; and
a routing circuit coupled to the memory array, the routing circuit comprising:
a plurality of selector circuits, each of the plurality of selector circuits coupled to a plurality of entries; and
selection control logic coupled to each of the plurality of selector circuits for selectively enabling particular selector circuits to provide data words in an order of data word criticality to a processor; and a processor-cache interface coupled to the plurality of selector circuits, the interface adapted to receive data words, and tag bits and ECC bits, in the order of data word criticality to the processor.

37. A method of operating a circuit, the method comprising:
determining an order of data criticality to a processor;
configuring selection logic to execute data transfers as a function of the order, wherein the selection control logic is coupled to a plurality of data pathways;
receiving a memory address;
selecting a cache line of memory from a plurality of lines of memory, as a function of the memory address;
executing the selection logic to enable data pathways that correspond to the order;
transferring the data to an interface using the plurality of data pathways; and
forwarding the data from the interface to the processor.

38. The method of claim 37 wherein receiving a memory address comprises reading a memory address from a data bus.

39. The method of claim 37 wherein determining an order of data criticality to a processor comprises determining the type of processor.

40. A system comprising:
a processor having an order of data criticality;
a processor-cache interface coupled to the processor, the interface comprising a plurality of entries;
a routing circuit coupled to the interface, the circuit comprising:
a plurality of pathways, each pathway coupled to an interface entry; and
logic coupled to each of the pathways, the logic executable for transferring data via the pathways to the interface as a function of the order of data criticality; and
a memory array coupled to the circuit, the array comprising a plurality of cache lines, each cache line comprising a plurality of array entries, wherein data is stored in an array entry.

41. The system of claim 40 wherein each of the plurality of pathways is coupled to a plurality of array entries.

42. The system of claim 40 wherein the memory array stores status bits and error correction code bits.

43. A method of transferring data comprising:
storing a plurality of data words in a plurality of entries, the entries arranged in an array having lines;
storing tag bits in a plurality of entries, the entries arranged in an array having lines, the lines corresponding to the lines of data words;
receiving an address;
selecting the tag bits associated with the address;
selecting the line of data words corresponding to the selected tag bits;
ordering the data words in the selected line and tag bits in an order of criticality to a processor;
storing the data words and tag bits in an interface having a plurality of entries, the data words and tag bits stored as a function of the order of criticality; and
forwarding the data words and tag bits from the interface to the processor.

44. The method of claim 43 further comprising selecting an order of criticality to the processor.

45. The method of claim 43 further comprising:

storing status bits and error correction code bits in a plurality of entries, the entries arranged in an array having lines, the lines corresponding to the lines of data words; and further wherein ordering the data words in the selected line and tag bits in an order of criticality to a processor further comprises ordering the data words in the selected line, tag bits, status bits and error correction code bits in an order of criticality to a processor; and further wherein storing the data words and tag bits in an interface having a plurality of entries, the data words and tag bits stored as a function of the order of criticality comprises storing the data words, tag bits, status bits and error correction code bits in an interface having a plurality of entries, the data words, tag bits, status bits and error correction code bits stored as a function of the order of criticality; and further wherein forwarding the data words and tag bits from the interface to the processor comprises forwarding the data words, tag bits, status bits and error correction code bits from the interface to the processor.

* * * * *

UNITED STATES PATENT AND TRADEMARK OFFICE
CERTIFICATE OF CORRECTION

PATENT NO. : 6,266,796 B1
DATED : July 24, 2001
INVENTOR(S) : Pawlowski et al.

It is certified that error appears in the above-identified patent and that said Letters Patent is hereby corrected as shown below:

Column 2,
Line 59, delete "c01" and insert -- x01 --, therefor.

Column 3,
Line 8, delete "note" and insert -- noted --, therefor.

Column 5,
Line 7, delete "circuits 65" and insert -- circuits 75 --, therefor.

Column 8, claim 22,
Line 45, delete "in the in" and insert -- in the --, therefor.

Column 9, claim 29,
Line 20, delete "pathways;" and insert -- pathways; and --, therefor.

Signed and Sealed this

Twenty-sixth Day of February, 2002

Attest:

*Attesting Officer*

JAMES E. ROGAN
*Director of the United States Patent and Trademark Office*